United States Patent [19]

Barton et al.

[11] 4,050,689
[45] Sept. 27, 1977

[54] PNEUMATIC FLEXIBLE BUMPER

[75] Inventors: David W. Barton, Birmingham; George H. Muller, Ann Arbor, both of Mich.

[73] Assignee: Ford Motor Company, Dearborn, Mich.

[21] Appl. No.: 404,580

[22] Filed: Oct. 9, 1973

Related U.S. Application Data

[63] Continuation-in-part of Ser. No. 315,253, Dec. 14, 1972, abandoned, which is a continuation-in-part of Ser. No. 201,828, Nov. 24, 1971, Pat. No. 3,768,850, which is a continuation of Ser. No. 836,776, June 26, 1969, abandoned.

[51] Int. Cl.² .............................................. B60R 19/10
[52] U.S. Cl. .................................. 293/71 P; 267/140
[58] Field of Search .................. 293/1, 70, 71 R, 71 P, 293/88; 114/219; 267/140, 141

[56] References Cited

U.S. PATENT DOCUMENTS

| 2,910,033 | 10/1959 | Weisburg | 114/219 |
| 3,181,849 | 5/1965 | Mitchell | 267/140 |
| 3,335,689 | 8/1967 | Hein | 114/219 |
| 3,810,668 | 5/1974 | Kornhauser | 293/71 P |

FOREIGN PATENT DOCUMENTS

| 1,035,216 | 8/1953 | France | 293/71 P |
| 353,289 | 7/1931 | United Kingdom | 293/71 R |

Primary Examiner—Robert W. Saifer
Attorney, Agent, or Firm—John J. Roethel; Keith L. Zerschling

[57] ABSTRACT

A flexible, pneumatic bumper adapted for motor vehicle applications. A plurality of individual chambers are defined by a resiliently deformable outer bumper shell, a supporting plate secured to the vehicle structural members and a plurality of baffles or separator elements extending from the bumper shell toward or to the mounting plate. When the outer bumper shell is displaced inwardly due to an impact force, resultant chamber deformation causes an increase in chamber pressure that is relieved by air being forced out of the chamber to an adjacent chamber or to the atmosphere through a pressure relief valve. Following impact, return of the bumper shell to its original shape is slowed by a restricted return air flow into the chambers thereby preventing bumper rebound forces.

The separator elements may be designed to provide a preloading effect or a maximum buckling resistance when the bumper shell is installed on the supporting plate. Also, the separator elements may permit controlled air transfer between chambers to supplement or eliminate the pressure relief valves.

5 Claims, 15 Drawing Figures

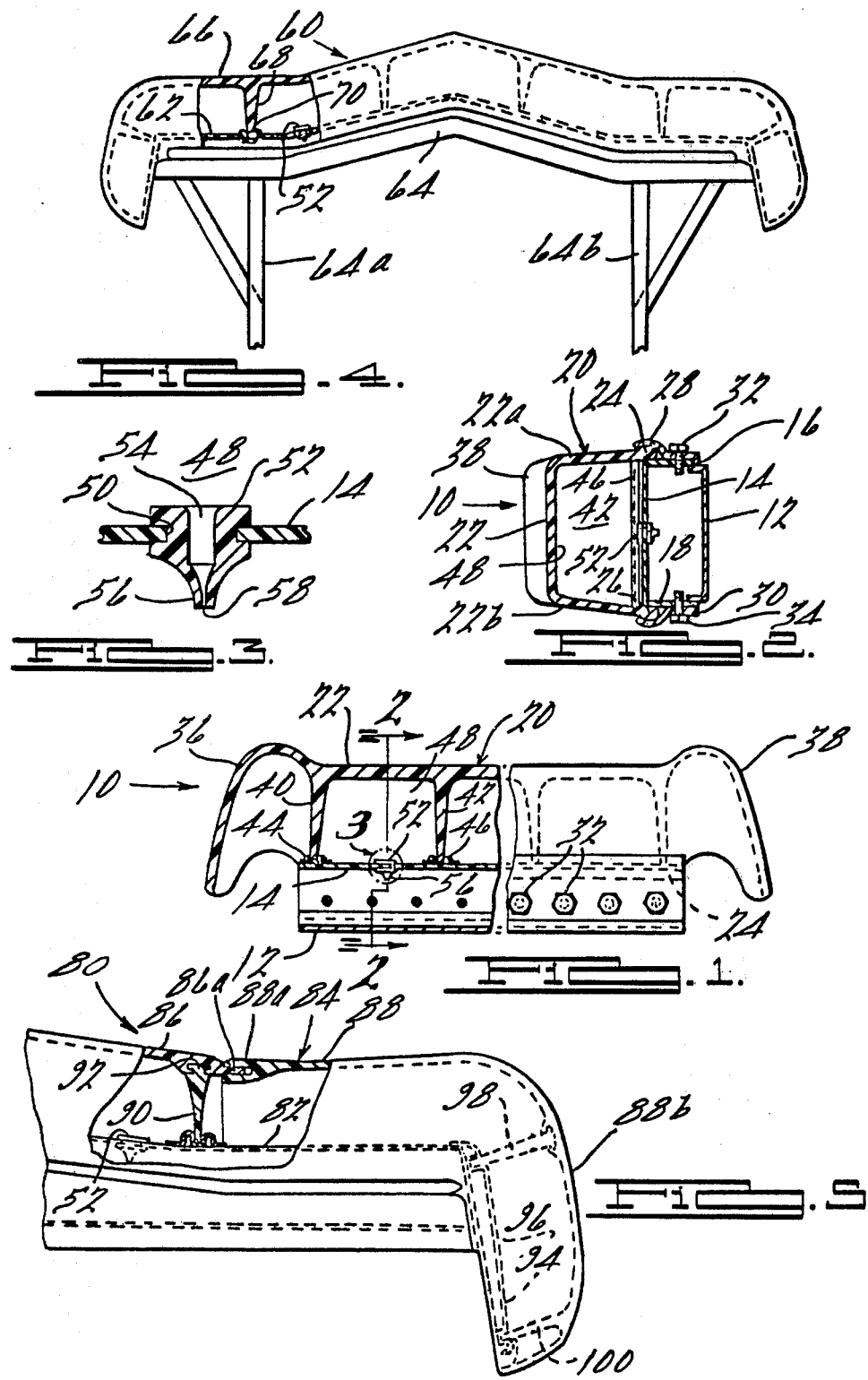

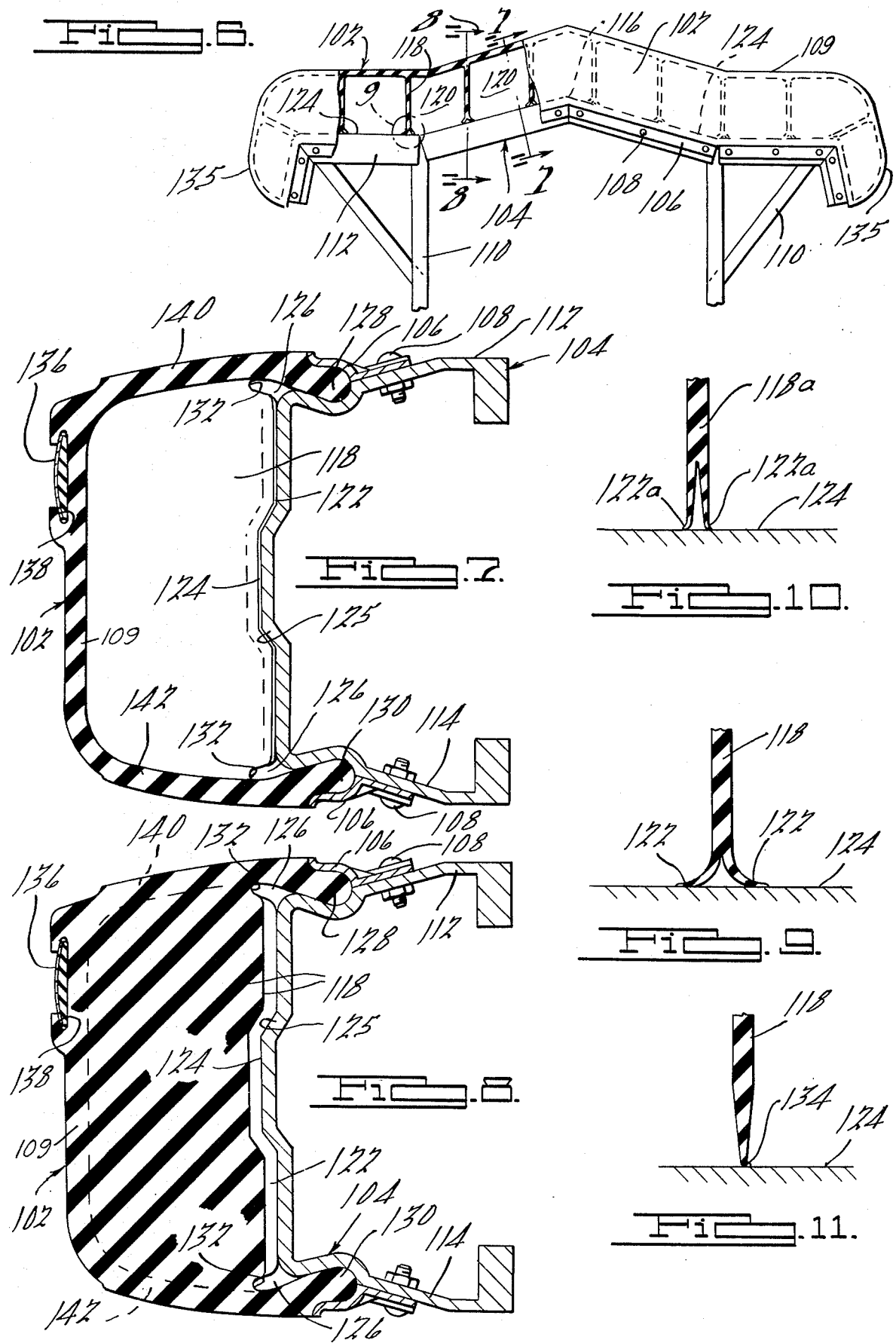

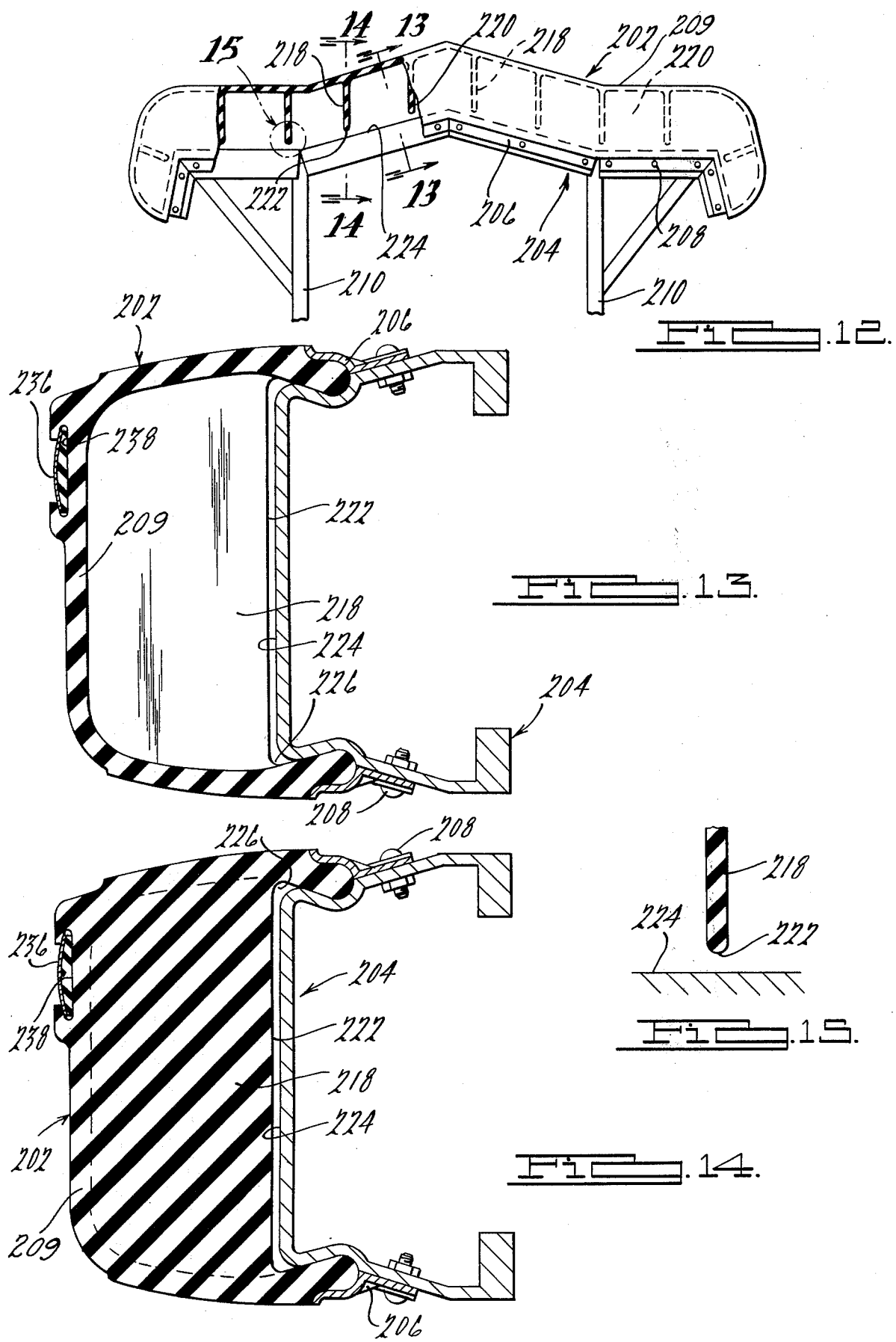

PNEUMATIC FLEXIBLE BUMPER

This is a Continuation-in-Part of application Ser. No. 315,253 filed Dec. 14, 1972, now abandoned, which was a Continuation-in-Part of Ser. No. 201,828 filed Nov. 24, 1971, now U.S. Pat. No. 3,768,850 issued Oct. 30, 1973, Application Ser. No. 201,828 was a Continuation of Ser. No. 836,776 filed June 26, 1969, now abandoned.

BACKGROUND OF THE INVENTION

The prior art details numerous disclosures of flexible, motor vehicle bumpers that take advantage of the large energy absorbing capabilities of fluid systems. It is believed that such bumpers have restricted in their feasible production applications by two factors: lack of reliability and relatively great manufacturing costs.

Liquid filled bumpers and bumpers wherein a gas is encapsulated under pressure are prone to develop leaks. This is because the outer shells of such bumpers must be constructed from elastomeric materials that are subject to puncture or other sealing features during normal vehicle operation. In addition, known flexible bumpers including single or multiple, self-contained fluid chambers are difficult and costly to manufacture and can be secured to the vehicle structure to be protected only be relatively complex and expensive attachment means.

It is an object of this invention to provide a flexible, energy absorbing bumper adapted for use on a motor vehicle that takes advantage of the energy absorbing potential of fluid systems, but avoids the drawbacks to such bumpers encountered in the prior art and detailed above. More particularly, this invention provides a pneumatic bumper wherein air chambers are defined by a support and an elastomeric member that may be manufactured by conventional techniques that are compatible with high volume, low cost production. Small leaks in the structure defining these chambers do not affect bumper reliability because the air encapsulated therein normally is at atmospheric pressure and is pressurized during an impact at too great a rate to be significantly affected by such leaks. Furthermore, the bumper of this invention is reusable as the elastomeric member returns to its original shape following an impact thereupon. This return to its original shape by the elastomeric member occurs without giving rise to objectionable rebound forces.

This invention also provides a resilient pneumatic bumper in which the elements separating the chambers are so designed to create a preloading effect or a maximum buckling resistance. Also, the separator elements may provide controlled airflow from chamber to chamber upon impact of the bumper shell.

SUMMARY OF THE INVENTION

An energy absorbing bumper assembly constructed in accordance with this invention is adapted to be utilized for protecting motor vehicle structure from impact damage. The bumper assembly includes a portion of the vehicle structure comprising a bumper mounting plate. A resiliently deformable bumper shell means is operatively secured to the mouting plate and cooperates therewith to define a chamber therebetween. A plurality of resiliently deformable separator elements extend from the inside surface of the bumper shell through the chamber to the mounting plate and divide the chamber into a plurality of individual cells. Plural indentation means are formed on the mounting plate. The end of each of the separator elements remote from the bumper shell means is removably positioned in one of the indentation means formed in the bumper plate. Each of the individual chamber portions is vented to the atmosphere through a pressure release valve mounted in one of a plurality of apertures formed through the mounting plate.

Alternate embodiments of the invention include separator or baffle constructions that may be preloaded against the bumper mounting plate, that may engage the mounting plate without significant preload or that are spaced from the mounting plate and which obviate the mounting plate indentation means described previously. In addition, the separator means may provide interchamber communication to supplement or eliminate the pressure relief valves.

DESCRIPTION OF THE DRAWINGS

FIG. 1 is a top view with a section broken away of a first embodiment of pneumatic flexible bumper constructed in accordance with this invention.

FIG. 2 is a sectional view taken along the line 2—2 of FIG. 1.

FIG. 3 is an enlarged view of that portion of the structure of FIG. 1 located within the circle three.

FIG. 4 is a view similar to FIG. 1, but illustrating a second embodiment of pneumatic flexible bumper constructed in accordance with this invention.

FIG. 5 is a partial top view, having a section broken away, of a third embodiment of pneumatic flexible bumper constructed in accordance with this invention.

FIG. 6 is a top view, having a section broken away of a fourth embodiment of a flexible bumper constructed in accordance with the invention.

FIG. 7 is a cross sectional view along line 7—7 of FIG. 6.

FIG. 8 is a cross sectional view along line 8—8 of FIG. 6.

FIG. 9 is an enlarged cross sectional view of that portion of the structure of FIG. 6 located within the circle 9 showing the free edge of a preloaded separator element.

FIG. 10 is an enlarged cross sectional view of that portion of the structure of FIG. 6 located with the circle 9 showing an alternate embodiment of the free edge of a separator element that is substantially unloaded and undeformed.

FIG. 11 is a cross sectional view similar to FIG. 9 showing an additional construction of the separtor element.

FIGS. 12-15 illustrate yet another embodiment of the invention.

FIG. 12 is a top view, having a section broken away, of another embodiment constructed in accordance with this invention.

FIG. 13 is a cross sectional view along line 13—13 of FIG. 12.

FIG. 14 is a cross sectional view along line 14—14 of FIG. 12.

FIG. 15 is an enlarged cross sectional view of encircled portion of the structure of FIG. 12 showing a free edge of a separator element spaced from the front surface of the mounting plate.

DETAILED DESCRIPTION OF THE INVENTION

Referring now to FIGS. 1 and 2 of the drawing, the numeral 10 denotes a first embodiment of the flexible, pneumatic bumper of this invention. The numeral 12 identifies a vehicle structural member such as a front frame member. A bumper mounting plate 14, having an upper arm 16 and a lower arm 18, is secured by conventional joining techniques, such as welding, to structural member 12. The joints between mounting plate 14 and structure 12 are located along the upper and lower arms 16 and 18 of the mounting plate.

The bumper assembly includes an elastomeric member 20 that is resiliently deformable and is constructed of material such as dense urethane foam or rubber. The elastomeric member 20 has a main body or shell 22 that is spaced from mounting plate or backing member, an upper arm 22a extending from shell 22 to mounting plate 14 and a lower arm 22b extending from the shell to the bottom of the mounting plate. Enlarged beads 24 and 26 are formed on the ends of arms 22a and 22b respectively.

Elastomeric member 20 is secured to plate 14 by means of a clamp type connection. This connection includes a pair of clamps 28 and 30 secured to upper and lower mounting plate arms 16 and 18, respectively, by fasteners 32 and 34. These clamps essentially are S-shaped and engage beads 24 and 26 to maintain the elastomeric member in the position illustrated in FIGS. 1 and 2.

As best may be seen in FIG. 1, the end portions 36 and 38 of shell 22 are arcuate and curve about the side of mounting plate 14. With bumper 10 mounted on a motor vehicle, end portions 36 and 38 would extend about the fenders of the vehicle as do conventional metal bumpers to give increased protection to the vehicle sheet metal.

A plurality of separator members or partitions, two of which are identified in FIG. 1 by the numerals 40 and 42, integrally are formed with shell 22 and extend therefrom across the space between shell 22 and mounting plate 14. A plurality of brackets having grooves formed therein, two of said brackets being identified in FIG. 1 by the numerals 44 and 46, are secured to mounting plate 14 such that the separator members will register therewith. As may be seen in FIG. 1, the ends of separator members 40 and 42 remote from shell 22 are received in the grooves defined by brackets 44 and 46 respectively. This positioning of the end portions of the separator member in the grooved brackets provides for an air tight seal between these members while not impeding easy assembly of the elastomeric member 20 with the mounting plate 14.

The cooperation between separators 40 and 42 and brackets 44 and 46 allow the definition of an air tight chamber 48 defined by shell 22, mounting plate 14 and separators 40 and 42. It may be appreciated by reference to the drawings that a plurality of such chambers are defined along the length of the elastomeric member 20.

As best may be seen from FIGS. 2 and 3 of the drawing, chamber 48 is vented to the atmosphere through an aperture 50 formed in mounting plate 14. Positioned in aperture 50 is a valve 52. This valve has a passageway 54 extending therethrough. The end of passageway 54 remote from chamber 48 has a portion 58 of reduced cross sectional area defined by a valve lip 56.

The bumper assembly illustrated in FIGS. 1 to 3 is operative to protect the structure 12 and other attendant vehicle structure due to its capability of absorbing impact energy. This absorption of energy is due to the fact that the chambers, such as chamber 48, comprise pneumatic chambers. Under normal conditions, elastomeric member 20 is in the undeformed condition illustrated in the drawing and chamber 48 is filled with air at atmospheric pressure. This pressure is insured by the communication of chamber 48 with the atmosphere through the small opening 58 in valve 52. Upon shell 22 of elastomeric member 20 being impacted, the elastomeric member is deformed as by shell 22 being pushed inwardly toward mounting plate 14. A reduction in the size of chamber 48 thus occurs. The small opening 58 in valve 52 does not allow quick passage of large amounts of air from chamber 48 to the atmosphere. In fact, valve 52 greatly impedes the flow of air through aperture 50 so that the speedy reduction in size of chamber 48 results in an immediate rise in the air pressure within the chamber. The energy required to deform elastomeric member 20 and the energy required to force pressurized air from the chamber 48 through the valve is absorbed from the total energy of the impact force.

Upon the pressure within chamber 48 reaching a predetermined magnitude, lip 56 of valve 52 will open somewhat and opening 58 will become enlarged and will allow a greater volume of air to pass from chamber 48 through aperture 50. Valve 52 thus acts as a pressure relief valve and insures that chamber 48 acts as a cushioning member against an impact force directed against shell 22. The functioning of the chamber 48 described above is repeated, of course, for all the pneumatic chambers formed along the length of elastomeric member 20.

Following the termination of the application of an impact force to shell 22, the elastomeric member, being resiliently deformable, will return to its original configuration. The return to the original configuration by the elastomeric member somewhat is impeded by the design of valve 52. Since opening 58 is small, valve 52 inhibits greatly the passage of air from the ambient atmosphere back into the partially exhausted chamber 48. The return of the elastomeric member 20 to its original position thus is controlled so that movement toward the original configuration occurs quite slowly. This slow return of elastomeric member 20 to its normal configuration insures that excessive rebound forces caused by the resiliency of member 20 do not occur and that an undesirable bounce effect is prevented.

Elastomeric member 20, including the end portions 36 and 38 of shell 22 and separators 40 and 42, may be an integrally formed molding of elastomeric material and thus easily may be manufactured by large volume production techniques. It may be appreciated that a puncture to elastomeric member 22 does not operate to render the bumper ineffective in the absorption of energy. The hole caused by such a puncture would be quite small, even compared to the restricted orifice 58 of valve 52. During the sudden deformation of the elastomeric walls defining chamber 48, a small puncture hole would not allow a quick escape of the air from the chamber and thus would have no significant effect on the pressures within chambers 48.

FIGS. 4 and 5 illustrate second and third embodiments, respectively, of the energy absorbing bumper of this invention. Unless specifically noted in the description below, the bumper assemblies of these second and third embodiments are identical to the embodiment illustrated in FIGS. 1 through 3 and described in detail above.

Referring now to FIG. 4, the numeral 60 denotes a second embodiment of pneumatic, flexible bumper constructed in accordance with this invention and adapted to protect a motor vehicle structure including a front structural member 64 that is connected to side frame rails 64a and 64b. A bumper mounting plate 62 is secured, as by welding, to member 64. The elastomeric member of bumper assembly 60 includes an outer shell 66 and a plurality of separator members, one of which is identified by the numeral 68.

Bumper assembly 60 has a simplified construction relative to the bumper assembly 10 of FIGS. 1 and 2, in that mounting plate 62 has integrally formed therein a plurality of grooves, one of which is identified by the reference numeral 70. These integrally formed grooves are positioned so as to register with the end portion of the separator members that extend to a mounting plate 62 from the shell 66. As illustrated in FIG. 4, the end of separator member 64 remote from shell 66 is positioned within groove 70.

As discussed above, the mounting of elastomeric member separator elements within groove means forward on the bumper mounting plates of the embodiment of this invention are removable. This arrangement facilitates assembly of the pneumatic flexible bumper of the invention in that the elastomeric member need only be placed in its final position and secured by whatever connection means are utilized.

Referring now to FIG. 5 of the drawing, the numeral 80 denotes a third embodiment of pneumatic, flexible bumper assembly constructed in accordance with this invention. The design of bumper assembly 80 is adapted to facilitate assembly of this structure when a complex bumper shape is required. The bumper assembly 80 includes a backing plate 82 and an elastomeric member 84 that is a composite rather than an integrally formed member. Elastomeric member 84 has a first shell portion 86 with a tongue 86a extending therefrom. Adjacent first shell portion 86 is a second shell portion 88 having a bifurcated end portion 88a adapted to receive tongue 86a thereby providing for a connection between the shell portions 86 and 88.

Separator members extend from the composite shell members. One of the separator members is identified by the reference numeral 90 and has formed thereon a tenon 92. This tenon 92 is received in an undercut groove formed in shell portion 86. It thus may be seen that the bumper elastomeric member, if it need have a complex shape, may be formed as a composite from individual elastomeric members that simply may be put together due to the connection means described above.

Bumper assembly 80 also is distinguished by the fact that the end portions of this assembly include pneumatic chambers. It may be seen that shell portion 88 has an end 88b, remote from bifurcated end 88a, that is arcuate and curved about the side of backing plate 82. A second backing plate 94, secured to backing plate 82 as by welding, is arranged to correspond to the profile of shell end portion 88b. A pair of separator members 98 and 100 extend from shell end portion 88b to the second mounting plate 94 such that a pneumatic chamber 96 is formed. It thus may be appreciated that bumper assembly 80 provides the energy absorbing potential of pneumatic chambers that may be utilized even if a vehicle equipped with this bumper assembly is not impacted directly from the front, but rather is impacted slightly from the side such that the impact force would be received by the end 88b of the shell portion 88.

FIGS. 6–10 illustrate further embodiments of pneumatic flexible bumper assemblies incorporating the invention. The outer shell 102 is formed of a molded elastomeric material such as urethane and is secured to a backing member 104 by means of clamps 106 and a plurality of bolts 108. The backing member is of extruded aluminum having an extrusion section as shown in FIGS. 7 and 8. The front portion 109 of the outer shell 102 is essentially parallel to the front face 124 of the backing member as illustrated in FIGS. 6 and 7. The backing member is attached to the vehicle frame 110 or other similar structural members of the vehicle. The backing member may be shaped, if desired, as shown in FIG. 6 by slitting the upper and lower sections 112 and 114 where the bends are to occur. If the bend is to be convex in front at reference 116, then a small triangular section of material may be removed. The bend areas may be reinforced, if desired, by the location and structure of frame members 110.

Similarly to the previously described embodiments, a plurality of separators or partitions 118 divide the resilient outer shell 102 into a plurality of pneumatic chambers 120. The unattached back edges or edge portions 122 of the separators as molded are forked as shown in FIG. 10. When installed against the backing member 104, the edge portions are deformed or spread as shown in FIG. 9 and provide an effective seal against the front face 124 of the backing member. The interference fit of each separator 118 against the front face of the backing member provides a compressive preloading effect to each separator which increases the impact absorbing capacity of the bumper assembly. An alternate embodiment is illustrated by FIG. 10 of the drawings in which the separator elements 118a are not preloaded when the outer shell 102 is mounted on the backing member 112. The edge portions 122a of the embodiment of FIG. 10 are identical to the edge portions 122 of the embodiment of FIG. 9. The difference is that the length of separator 118a so that in its installed position separator 118a is not preloaded and edge portions 122a are not significantly deformed against backing member 124. The functional differences between the two embodiments is explained in a later paragraph.

The front face 124 of the backing member 104 may be plane or with a horizontally extending contour or rib 125 for added strength. The vertical slots defined by brackets 44 and 46 of the embodiment of FIG. 1 into which the separators 40 and 42 are received are not necessary with the embodiments of FIGS. 7–10 because the longitudinal depth of the separators 118 cause the edge portions 122 to either lightly engage or sealingly press against the backing member front face when the outer shell is fully installed. The transversely viewed contour of the edge of portions 122 is substantially similar to the transversely viewed contour of the front face 124 of the backing member.

A pair of passages 126 are formed between the separators 118 and the outer shell 102 adjacent the beads 128 and 130. The passages permit a controlled flow of air from one chamber to the next in the event that a pressure differential occurs between adjacent chambers as a result of impact. A radius 132 is provided at the end of each passage for stress relief to prevent tearing upon impact where the separator joins the outer shell.

FIG. 11 of the drawing illustrates a modified edge or end portion 134 which may be used in place of the forked edge shown in FIG. 9. While the single tapered end portion will not seal effectively as the forked edge or end portion 122, it may provide other advantages such as ease of manufacture which in certain situations render its usage advantageous. It may be preloaded upon installation (not shown) or free of loading as illustrated by FIG. 11.

The wrap-around end portions 135 of the outer shell 102 may include one or more horizontal baffles or separators (not shown) to give added energy absorbing capacity for sidewardly directed impacts.

A flexible bright faced trim strip 136 is received within a longitudinally extending groove or slot 138 formed in the outer shell 102.

FIGS. 12-15 illustrate an embodiment of the invention in which the separator elements are spaced from the front face of the backing member. The outer shell 202 is formed of a molded elastomeric material such as urethane and is secured to a backing member 204 by means of clamps 206 and a plurality of bolts 208. Tha backing member is of extruded aluminum having an extrusion section as shown in FIGS. 13 and 14. The front portion 209 of the outer shell 202 is essentially parallel to the front face 224 of the backing member as illustrated in FIGS. 12 and 13. The backing member is attached to the vehicle frame 210 or other similar structural members of the vehicle.

Similarly to the previously described embodiments, a plurality separators or partitions 218 divide the resilient outer shell 202 into a plurality of chambers 220. The unattached back edges or edge portions 222 of the separators are molded as shown in FIG. 15. When the outer shell 202 is installed on the backing member 204, the edge portions 222 are spaced from the front face 224 of the backing member as shown in FIGS. 12-15.

A flexible bright faced trim strip 236 is received within a longitudinally extending groove or slot 238 formed in the outer shell 202.

Communication between compartments or chambers 220 is provided by the clearance space between the front face 224 of the backing member 204 and the edges 222 of the partitions or separators 218. Upon a frontal impact to the bumper assembly the edges 222 immediately engage the backing member and substantially reduce the area of communication to the areas of connection 226 between the partitions and the outer shell. Air can thus be forced between compartments or through a restricted orifice or check valve (not shown) to dissipate energy.

It should be noted that a bumper embodiment incorporating a combination of features described above may be effectively used for energy absorption and dissipation. For example, a combination of partitions, some of which contact the front face of the backing member and others of which are spaced from the backing member, may be utilized to achieve stepped rates of deformation or impact resistance.

Each of the bumper embodiments described above absorb impact energy in several ways, which will be described with reference to FIGS. 7-10.

One is by the stretching of the separators 118 in vertical directions as the upper and lower walls 140 and 142, respectively, of the outer shell 102 bow or bulge outwardly on impact. A second is by the compression or folding of the separators 118 against the front face 126 backing member 104 as the frontal wall of the shell 102 moves rearwardly in the longitudinal direction of the vehicle. A third results from the compression of the air trapped within the chambers 120.

The pressure relief valves 52 (shown in FIGS. 1-6) and the air transfer passages 126 shown in FIGS. 7 and 8 provide energy dissipation as work is performed in forcing compressed air through these restrictions.

Whether or not the baffles or separators 118 engage the backing member 124 with a deforming preload (FIG. 9) or with no preload (FIGS. 10 and 11) determine the characteristics or response upon impact. A preloaded baffle provides greater total energy absorption for a maximum deformation of the outer shell. On the other hand, absence of preload on the baffles provides greater initial energy absorption during the earlier stage of deformation, but demonstrates less total energy absorption capacity for the full range of deformation.

It thus may be seen that this invention provides a pneumatic, resilient bumper in which the elastomeric shell 102 and partitions 118 of several embodiments may be molded as an internal unit. Further, a small puncture of the elastomeric outer shell 102, which partially defines several pneumatic chambers 120, does not impair the operability of the bumper of this invention because the encapsulated air present within the pneumatic chambers normally is at atmospheric pressure. This air quickly becomes highly pressurized upon impact being received by the bumper so that small leaks do not affect significantly its energy absorbing effectiveness. Furthermore, this invention utilizes the significant energy absorbing capacities of stretchable separtor elements.

Modifications and alterations may occur to those skilled in the art which are included within the scope of the following claims.

We claim:

1. A resiliently deformable bumper assembly for a vehicle or the like comprising:
   a rigid elongate backing member secured to the vehicle body,
   a resiliently deformable elongate outer shell,
   means securing said outer shell to the backing member,
   said outer shell and said backing member forming an elongate enclosure,
   said backing member having a front surface forming an inner wall of said enclosure,
   a plurality of independent, uninterconnected partitions extending generally transversely to said outer shell and dividing said enclosure into a plurality of consecutive compartments,
   said partitions being integrally formed with said outer shell and being integrally joined exclusively to said outer shell,
   each of said partitions having an edge unattached to said outer shell positioned adjacent the front surface of said backing member,
   said unattached edge of said partition engaging the front surface of said backing member,
   the portions of said partitions adjacent the unattached edges being resiliently deformed against said backing member to form seals therebetween and to place said partitions in compression between said outer shell and said front surfaces during normal unimpacted conditions.

2. A resiliently deformable bumper assembly for a vehicle or the like comprising:
   a rigid elongate backing member secured to the vehicle body,
   a resiliently deformable elongate outer shell,
   means securing said outer shell to the backing member,
   said outer shell and said backing member forming an elongate enclosure,
   said backing member having a front surface forming an inner wall of said closure, a plurality of partitions extending generally transversely to said outer shell and dividing said enclosure into a plurality of consecutive compartments, said partitions being integrally formed with said outer shell, each of said partition having an edge unattached to said outer shell positioned adjacent the front surface of said backing member, said unattached edge of said partition engaging the front surface of said backing member, the portions of said partitions adjacent the unattached edges being forked.

3. A resiliently deformable bumper assembly for a vehicle or the like comprising:

a rigid elongate backing member secured to the vehicle body, a resiliently deformable elongate outer shell, means securing said outer shell to the backing member, said outer shell and said backing member forming an elongate enclosure, said backing member having a front surface forming an inner wall of said enclosure, a plurality of independent, uninterconnected partitions extending generally transversely to said outer shell and dividing said enclosure into a plurality of consecutive compartments, said partitions being integrally formed with said outer shell and being integrally joined exclusively to said outer shell, each of said partitions having an edge unattached to said outer shell positioned adjacent the front surface of said backing member, said unattached edge of said partition engaging the front surface of said backing member, and passage means interconnecting adjacent compartments to permit limited flow of air therebetween, said passage means comprising a slot formed between the outer shell and a portion of the partition, said slot terminating at a radius connecting said partition and said outer shell.

4. A resiliently deformable bumper assembly for an automotive vehicle and the like comprising:

a rigid elongate backing member secured to the vehicle body, a resiliently deformable elongate outer shell, said outer shell including a longitudinally extending front portion and upper and lower walls directed rearwardly therefrom, said upper and lower walls terminating at upper and lower beads, respectively, means securing said beads to said rigid backing member, said outer shell and said backing member forming an elongate enclosure, said backing member having a front surface forming an inner wall of said elongate enclosure, a plurality of partitions extending generally transversely to the outer shell toward said backing member dividing the enclosure into a plurality of consecutive compartments, said partitions being integrally formed with said outer shell and continuously adjoining said outer shell along its front portion and along substantial portions of said upper and lower walls, said partitions being unattached to said outer shell along the remaining portions of said upper and lower walls adjacent said beads and along the edges of said partitions adjacent said backing member, the portions of said partitions adjacent the front surface of said backing member being deformed against said front surface so that the partitions are compressed between the outer shell and the backing member, and passage means between said partitions and said outer shell along said remaining portions of said upper and lower walls, said passage means communicating adjacent compartments and permitting limited flow of air therebetween in the event of a pressure differential between adjacent compartments.

5. A resiliently deformable bumper assembly for an automotive vehicle and the like comprising:

a rigid elongate backing member secured to the vehicle body, a resiliently deformable elongate outer shell, said outer shell including a longitudinally extending front portion and upper and lower walls directed rearwardly therefrom, said upper and lower walls terminating at upper and lower beads, respectively, means securing said beads to said rigid backing member, said outer shell and said backing member forming an elongate enclosure, said backing member having a front surface forming an inner wall of said elongate enclosure, a plurality of partitions extending generally transversely to the outer shell toward said backing member dividing an enclosure into a plurality of consecutive compartments, said partitions being integrally formed with said outer shell and continuously adjoining said outer shell along its front portion and along substantial portions of said upper and lower walls, said partitions being unattached to said outer shell along the remaining portions of said upper and lower walls adjacent said beads and along the edges of said partitions adjacent said backing member, the portions of said partitions adjacent the front surface of said backing member being forked and resiliently spread against said front surfaces, passage means between said partitions and said outer shell along said remaining portions of said upper and lower walls, said passage means communicating adjacent compartments and permitting limited flow of air therebetween in the event of a pressure differential between adjacent compartments.

* * * * *